United States Patent [19]

Lederman

[11] 4,362,344

[45] Dec. 7, 1982

[54] SEALED BALL BEARING WITH STAMPED RACES

[75] Inventor: Frederick E. Lederman, Sandusky, Ohio

[73] Assignee: General Motors Corporation, Detroit, Mich.

[21] Appl. No.: 289,491

[22] Filed: Aug. 3, 1981

[51] Int. Cl.³ .............................................. F16C 33/78
[52] U.S. Cl. .................................. 308/187.1; 308/196
[58] Field of Search ..................... 308/187.1, 196, 190, 308/187.2, 189 R, 191, 36.1; 277/95

[56] References Cited

U.S. PATENT DOCUMENTS 2,823,553  2/1958  Harrington ......................... 308/190
2,823,967  2/1958  Harrington ....................... 308/187.2
3,142,520  7/1964  Mueller ............................ 308/187.2
3,224,821  12/1965  Barr ...................................... 308/196
3,606,502  9/1971  De Germond ...................... 308/196
4,120,543  10/1978  Greene, Jr. et al. ................ 308/233
4,296,977  10/1981  Ladin ............................... 308/187.1

Primary Examiner—Lenard A. Footland
Attorney, Agent, or Firm—Patrick M. Griffin

[57] ABSTRACT

A unitized seal bearing includes stamped inner and outer races radially spaced by ball bearings and having a circumferential gap on each side thereof between circular edges of the inner and outer races. A rubber sealing ring fits within each gap, with the inner edge of the ring seating on the inner race and a side thereof adjacent the outer edge of the ring seating on an outer race.

4 Claims, 5 Drawing Figures

SEALED BALL BEARING WITH STAMPED RACES

BACKGROUND OF THE INVENTION

This invention relates to bearings and specifically to a unitized sealed angular contact bearing.

The upper mount of a McPherson strut normally includes a unitized sealed bearing. Such a bearing must accommodate thrust loads in both directions combined with some radial loads, loads which will change direction quite often. Since the speed of relative rotation between the bearing races will be relatively slow, such bearings can be formed with unground raceways. It is also desirable from a cost standpoint to form the bearing races by a method in which the inner and outer races, of which there are two for each bearing, are stamped from a single piece of metal and then split in a final step to create a minimum of scrappage. Bearings assembled from races so produced have a circumferentially extending gap on each side between each respective inner and outer race which must be sealed.

Unitized seal bearings are shown in the prior art. The bearings shown in the U.S. Pat. Nos. to Harrington 2,823,967 and Keleshian 3,800,384 each show a bearing with a circumferentially extending gap on each side thereof between the inner and outer races. In these structures, the bearing is sealed with a flat annular seal which is stretch fitted against the inner race and must turn therewith in order to make sealing contact with the outer race under the centrifugal force created by the bearing rotation. Such a seal is not suitable for a bearing as described which experiences low speed of rotation between the races as well as frequent change in direction of relative rotation. The bearing shown in Keleshian also requires a separate shield to exclude particulates.

SUMMARY OF THE INVENTIOn

The subject invention provides a bearing with stamped, or ground, inner and outer races in which the gap between the races is sealed with a separate rubber sealing ring which serves to seal the bearing races regardless of the direction of rotation of the bearing and also maintains the races of the assembled bearing in alignment.

The bearing includes a pair of stamped inner races and a pair of stamped outer races concentric therewith and formed by a "Siamese" stamping operation from a single blank. The races are assembled with a full complement of ball bearings therebetween leaving a circumferential gap extending around both sides of the bearing between the inner and outer races at the radius where the parts are cut apart during the stamping operation. A rubber sealing ring is snap fitted within each gap as a last assembly step. The sealing ring has inner and outer sealing lips which maintain sealing contact with both the inner and outer races. The sealing lips stay in contact with the races regardless of which race the seal moves with and regardless of the speed or direction of relative race rotation. Any compression, twisting, or misalignment of the races with respect to one another will not cause the rings to move out of sealing contact. The rings also fill the gap between the races to maintain a pair of outer flanges on the outer races in contact with one another, maintain the circumferential alignment of the outer races, and limit any misalignment.

It is therefore an object of the invention to provide a bearing having a separate sealing ring which maintains sealing contact with the inner and outer races regardless of the direction or speed of relative race rotation. It is another object of the invention to provide such a bearing wherein the sealing ring will exclude particulates from the bearing and retain the lubricant in the event of twisting or misalignment of the races with respect to one another. Is is a further object of the invention to provide such a bearing wherein the sealing ring helps to maintain the bearing races in alignment.

BRIEF DESCRIPTION OF THE DRAWING

These and other objects of the invention will appear from the following written description and the drawing in which.

DESCRIPTION OF THE PREFERRED EMBODIMENT

Figure 1:
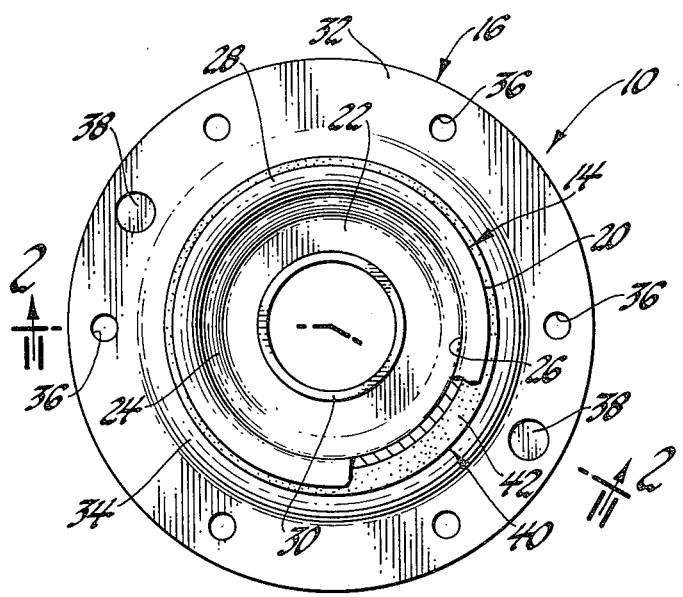
FIG. 1 is a plan view of the bearing with a portion of one of the inner races removed.
Figure 2:
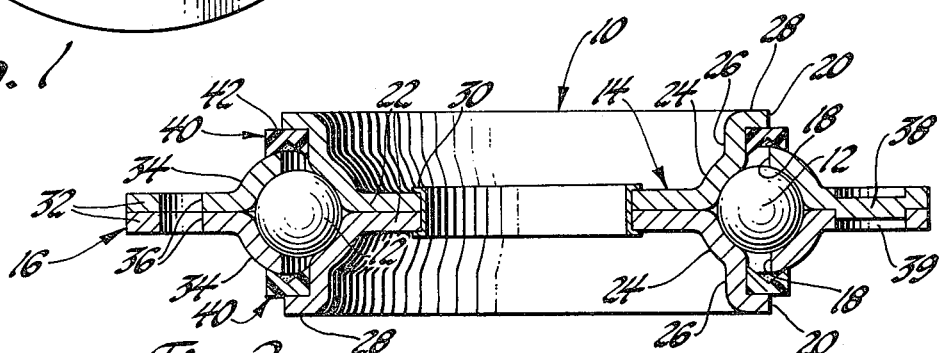
FIG. 2 is an enlarged sectional view taken along line 2—2 of FIG. 1.

Referring to FIGS. 1 and 2, the bearing generally designated at 10 is an angular contact bearing having four point contact with a full complement of ball bearing elements 12 included between a pair of inner races designated generally at 14 and a pair of outer races designated generally at 16 and concentric with inner races 14. Inner races 14 and outer races 16 are stamped from sheet steel which is later case hardened and unground. Inner races 14 and outer races 16 are stamped in a "Siamese" type stamping operation in which an outer race 16 and an inner race 14 are stamped from a single blank and separated leaving each race with a respective circular edge at equal radius, 18 and 20. When the ball bearing elements 12 are assembled between the races, a circumferentially extending gap is created between circular edge 18 and 20 which it is necessary to seal in order to retain lubricant and exclude particulates.

Each inner race 14 includes an innermost flange 22, a curvilinear raceway 24, a generally axially projecting portion 26, and generally radially extending portion 28 which terminates in the circular edge 20. Inner flanges 22 are secured together during the assembly operation with a crimp ring 30. Each outer race 16 includes an outer flange 32 and a curvilinear raceway 34 which terminates in the circular edge 18. Curvilinear raceways 34 and 24, in the embodiment disclosed, have a curvature of 56% although this may be changed to suit the desired application. The outer flanges 32 of races 16 abut and include a series of radially spaced holes 36 therethrough which are used to join the bearing to another structure, such as the elastomer mounting of the upper end of a McPherson strut. Flanges 32 are maintained in their desired circumferential position with the holes 36 aligned by two pairs of matching male projections 38 and female depressions 39 stamped into flanges 32.

A full complement of bearing elements 12 along with the desired type and amount of lubricant is assembled between the curvilinear raceways 34 and 24, whereupon the bearing 10 takes on the general configuration shown in FIG. 2. In the absence of a sealing ring, the outer races 16 may move axially and radially with respect to inner races 14, and may also separate from one another along the mated outer flanges 32 because of the circumferentially extending gap between circular edges 18 and 20. Because the races are stamped from a one piece blank, there is no extra metal to crimp over to fill the gap. A rubber sealing ring 40 seals the gap between circular edges 18 and 20 to retain lubricant and exclude particulates and to maintain the mated flanges 32 of races 16 in alignment.

Figure 3:
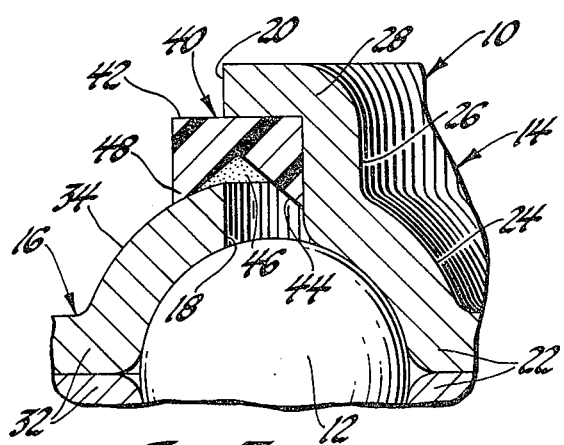
FIG. 3 is an enlargement of a portion of FIG. 2 showing a cross-section of the sealing ring.

In the embodiment shown in FIG. 3, ring 40 has a flat side 42 and a side 44 with a circumferentially extending groove 46 of V-shaped cross-section. Side 44 thus provides an angular outer sealing lip 48 at the OD of ring 40. The ID of ring 40 is substantially equal to or slightly less than the OD of axially extending portion 26 of race 14, while the diameter of outer sealing lip 48 is greater than the diameter of edge 18. The thickness of ring 40 between sides 42 and 44 is slightly greater than the width of the gap between edges 20 and 18. Thus, when, as a final assembly step, ring 40 is stretched over circular edge 20 and allowed to snap into the gap between edges 20 and 18, the ID of ring 40 will seat in sealing contact with axially extending portion 26 while lip 48 will seat in sealing contact with the outside surface of curvilinear raceway 34 near circular edge 18. This is done for both sides of the bearing assembly 10 as seen in FIG. 2. Because of its cross-sectional shape, ring 40 is a "landriding" seal, that is, lips 48 will stay in sealing contact with their respective curvilinear raceways 34 even if some slight radial or axial misalilgnment of the inner races 14 and outer races 16 occurs. Thus, sealing rings 40 serve to both retain the desired lubricant as well as exclude foreign particles from the ball bearing elements 12. Sealing contact is maintained regardless of the relative speed or direction of rotation between races 14 and 16. It is also unnecessary for ring 40 to be tied to either race 14 or race 16. Rings 40 fill the gaps between the pairs of circular edges 20 and 18 to keep the outer flanges 32 of outer races 16 in abutment so that holes 36 do not become misaligned. Thus, the assembly 10 is effectively unitized by the sealing rings 40.

Figure 4:
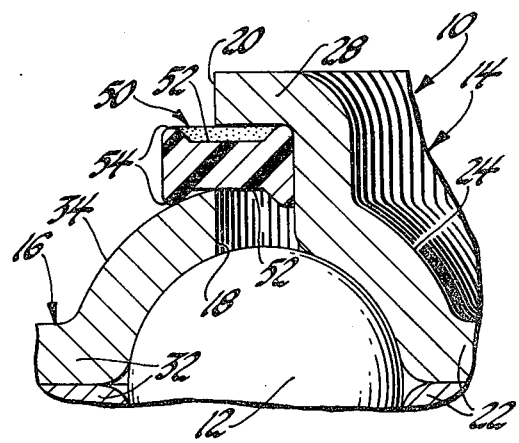
FIGS. 4 and 5 are view similar to FIG. 3 showing alternate embodiments of the sealing ring.
Figure 5:
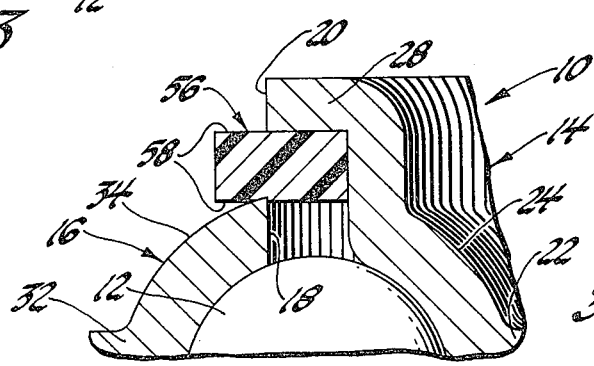

Alternate embodiments of sealing rings which achieve the same objects can be seen in FIGS. 4 and 5. In FIG. 4, ring 50 has a circumferentially extending groove 52 of identical truncated V-shape cross-section in each side. Grooves 52 thus form a pair of outer sealing lips 54 at the OD of ring 50. Since ring 50 has the same dimensions as ring 40, it achieves the same sealing and misalignment objects as ring 40, but, because of its symmetrical cross-section, it may be applied in either direction. Ring 56 in FIG. 5 has two flat sides 58. Ring 56 has no sealing lips, but since it also has the same dimensions as ring 40, one side 58 seats in sealing contact with circular edge 18. It is applicable in either direction.

Thus, the invention provides a bearing with sealing rings to seal the gap between the inner and outer races regardless of the speed or direction of relative bearing rotation, and which maintains sealing contact in the event of race misalignment while also acting to limit misalignment.

The embodiments of the invention in which an exclusive property or privilege is claimed are defined as follows:

1. A bearing, comprising,
   a pair of inner bearing races, each having a curvilinear raceway, a pair of outer bearing races concentric with the inner races, each outer race having a curvilinear raceway in confronting relation to a respective raceway of an inner race,
   a complement of antifriction elements disposed in rolling engagement between the confronting raceways of the inner and outer races,
   the raceway of each inner race further including an axially extending portion and a radially extending portion terminating in a first circular edge,
   the raceway of each outer race further including a second circular edge which is of substantially the same radius as the first circular edge and is axially spaced therefrom,
   an annular seal disposed in the space between each respective first and second circular edge, each seal including an outer sealing lip in sealing contact with the raceway of an outer race and an inner diameter in sealing contact with the axially extending portion of an inner race, each seal filling the space between the respective first and second circular edges to limit misalignment of the inner and outer bearing races.

2. A bearing comprising, a pair of inner bearing races, each having a curvilinear raceway,
   a pair of outer bearing races concentric with the inner races, each outer race having a curvilinear raceway in confronting relation to a respective raceway on an inner race,
   a complement of antifriction elements disposed in rolling engagement between confronting raceways of the inner and outer races,
   the raceway of each inner race further including an axially extending portion and a radially extending portion terminating in a first circular edge, the raceway of each outer race including a second circular edge which is of substantially the same radius as the first circular edge and is axially spaced therefrom,
   an annular seal disposed in the space between each respective first and second circular edge, each seal including a flat first side and a second side including a circumferentially extending groove therein which defines an outer sealing lip, the outer lip being in sealing contact with the raceway of an outer race, and the inner diameter of the seal being in sealing contact with the axially extending portion of an inner race, the thickness of each seal between the sides thereof being slightly greater than the spacing between each respective first and second circular edge to fill the space between such edges and limit misalignment of the inner and outer bearing races.

3. A bearing, comprising, a pair of inner bearing races, each having a curvilinear raceway,
   a pair of outer bearing races concentric with the inner races, each outer race having a curvilinear raceway in confronting relation to a respective raceway on an inner race,
   a complement of antifriction elements disposed in rolling engagement between confronting raceways of the inner and outer races,
   the raceways of each inner race further including an axially extending portion and a radially extending portion terminating in a first circular edge, the raceway of each outer race including a second circular edge which is of substantially the same radius as the first circular edge and is axially spaced therefrom, an annular seal disposed between each respective first and second circular edges, each seal including a circumferentially extending groove on each side thereof, each groove defining annular inner and outer sealing lips, the outer sealing lip of one side of the seal being in sealing contact with the raceway of an outer race, and the inner diameter of each seal being in sealing contact with the axially extending portion of an inner race, the thickness of each seal between the sides thereof being slightly greater than the spacing between each respective first and second edge to fill the space between the first and second edges and limit misalignment of the inner and outer races.

4. A bearing comprising, a pair of inner bearing races, each having a curvilinear raceway, a pair of outer bearing races concentric with the inner races, each outer race having a curvilinear raceway in confronting relation to a respective raceway on an inner race, a complement of antifriction elements disposed in rolling engagement between confronting raceways of the inner and outer races, the raceway of each inner race further including an axially extending portion and a radially extending portion terminating in a first circular edge, the raceway of each outer race including a second circular edge which is of substantially the same radius as the first circular edge and is axially spaced therefrom, a flat annular seal disposed between each respective first and second circular edge, each seal having a thickness slightly greater than the spacing between each respective first and second edge, one side of each seal being in sealing contact with the first circular edge of an outer race, the inner diameter of each seal being in sealing contact with the axially extending portion of an inner race, each seal having a thickness slightly greater than the spacing between each respective first and second edge to fill the space between each first and second edge and limit misalignment of the inner and outer races.

* * * * *